United States Patent [19]

Kawanabe

[11] 4,366,545

[45] Dec. 28, 1982

[54] RECORDING TYPE ELECTRONIC APPARATUS

[75] Inventor: Tsuyoshi Kawanabe, Yokohama, Japan

[73] Assignee: Canon Kabushiki Kaisha, Tokyo, Japan

[21] Appl. No.: 136,772

[22] Filed: Apr. 3, 1980

[30] Foreign Application Priority Data

Apr. 10, 1979 [JP] Japan .................................. 54-42499

[51] Int. Cl.³ ......................... G06F 3/12; G06F 15/02
[52] U.S. Cl. .................................... 364/569; 364/705; 364/710
[58] Field of Search ............... 364/405, 406, 569, 705, 364/710; 235/92 AC, 92 T

[56] References Cited

U.S. PATENT DOCUMENTS 4,283,769 8/1981 Asada .................................... 364/710

Primary Examiner—Jerry Smith
Attorney, Agent, or Firm—Fitzpatrick, Cella, Harper & Scinto

[57] ABSTRACT

Recording type electronic apparatus having a clock circuit and a printer wherein detecting means is provided to detect application of supply voltage to the electronic apparatus and an output from the clock circuit is printed out by the printer at the time of generating a detection output from the detecting means.

3 Claims, 5 Drawing Figures

RECORDING TYPE ELECTRONIC APPARATUS

BACKGROUND OF THE INVENTION

1. Field of the Invention

This invention relates to recording type electronic apparatus, and more particularly to electronic desk calculators, adders, and cash registers having a printer (referred to as "electronic desk calculators etc." hereafter) wherein means are provided to print out year, month, day, minute, and second for that time automatically when the power is turned on.

2. Description of the Prior Art

In conventional recording type electronic desk calculators etc., a method of reading day, time, etc. separately from a calendar and a clock and entering these data manually from a keyboard to have them printed out has been employed in order to print out the day, time, etc. In the electronic desk calculators etc. employing this system, in addition to the complexity in manual input, a long time is needed before printing and, moreover, there may occur frequent errors in the reading and in the manual input after reading.

SUMMARY OF THE INVENTION

Accordingly an object of this invention is to provide a recording type electronic apparatus capable of printing such time data as day, hour, etc. in a very simplified way.

Another object of this invention is to provide a recording type electronic apparatus capable of printing time data accurately and without error.

Another object of this invention is to provide a recording type electronic apparatus capable of printing time data without performing special operations for recording time data.

A further object of this invention is provide a recording type electronic apparatus capable of recording the time at which the electronic apparatus begins operating.

Another object of this invention is to provide a recording type electronic apparatus having a reduced number of operation switches.

Yet another object of this invention is to provide a recording type electronic apparatus capable of indicating when the power supply is recovered if interrupted by accident etc.

DESCRIPTION OF THE PREFERRED EMBODIMENTS

Figure 1:
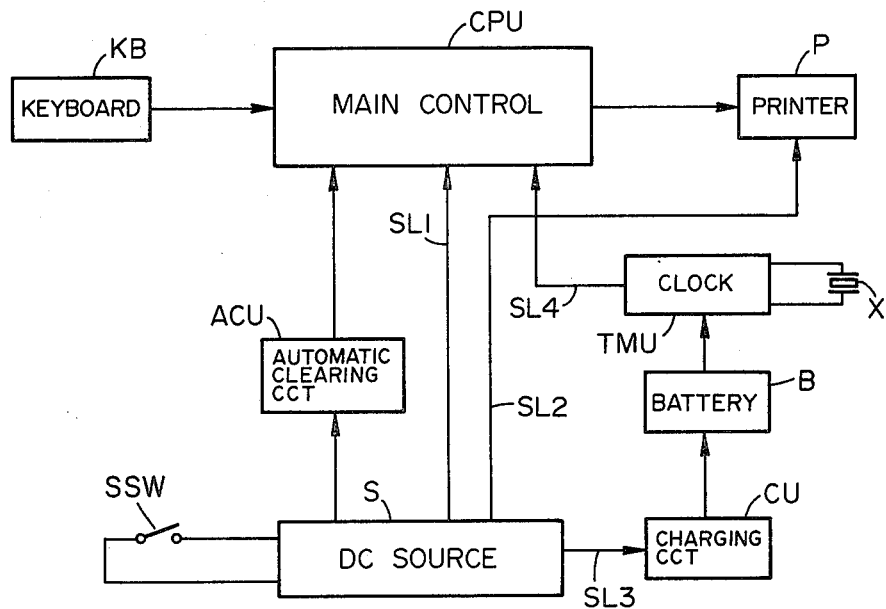
FIG. 1 is a schematic block diagram illustrating an embodiment of this invention.

FIG. 1 is a schematic block diagram showing a total configuration of an embodiment of a recording type electronic desk calculator to which this invention is applied. In FIG. 1, SSW denotes a power switch used to turn on and off a DC source S to the remaining circuitry. ACU designates an automatic clearing circuit, as means of detecting a power voltage supply, which detects the turning on of power switch SSW, and sends the detecting signal to main control CPU to clear the arithmetic circuit, memory, printing control, etc. to their initial states. The main control CPU is supplied with electric power from the power source S through lead SL1. The control circuit performs predetermined arithmetic operations and storage operations upon receipt of numeric inputs and commands from the keyboard KB, on which numeral keys, arithmetic operation commanding keys and decimal point designating keys are arranged. When a print command is issued, the control circuit drives the printer P by performing predetermined print control. Electric power is supplied to the printer P from the power source S through the connection SL2.

On the other hand, TMU indicates a clock circuit which has a built-in oscillator which uses a crystal resonator X. The timing outputs for second, minute, hour, etc. are formed by frequency dividing its oscillation frequency by a counter etc. Signals for day, month, and year are formed by further frequency dividing these timing outputs according to predetermined regulations. The battery B is connected to this clock circuit TMU all the time so that the clock circuit TMU continuously provides a time data output independent of the state of the power switch SSW. The battery B does not supply power to the main control CPU and printer P. Moreover, it is preferable to compose the clock circuit with CMOS's, whose power consumption is small, in order to lengthen the life of the battery B. A charger circuit CU is used to charge the battery B from DC power supply S when the battery B is a secondary cell. This charger circuit CU is supplied with power from the DC power source S through the line SL3. The charger circuit CU is not needed when the battery B is a primary cell.

By the configuration mentioned so far, the clock circuit TMU, which is always supplied with power from the batery B even when the power switch SSW is in its off state, continues counts time for year, month, day hour, minute, and second pre-set in advance, and always continues the clock signals for year, month, day, hour, minute, and second of the present point to the main control CPU through signalling line SL4.

When the power switch SSW is turned on, the power source S starts supplying power to the main control CPU, printer P, and charging circuit CU. On the other hand, by the turning on of the power switch SSW, the automatic clear circuit ACU is put in operation and the turning on of the power switch SSW is detected. The turning-on detection signal is sent to the main control unit CPU to perform the necessary clearing operation of its arithmetic circuit, storage, and printing control.

Next, following this clearing operation, the main control CPU automatically performs a time data print control. In other words, the main control CPU prints the time data immediately after the turning-on of the power switch SSW by driving the printer P on the basis of the clock signals for year, month, day, minute, and second transmitted from the clock circuit TMU. When this printing is completed, the main control CPU assumes its waiting state for receiving various key inputs from the keyboard and then performs the operation of ordinary recording type electronic desk calculator.

Figure 2:
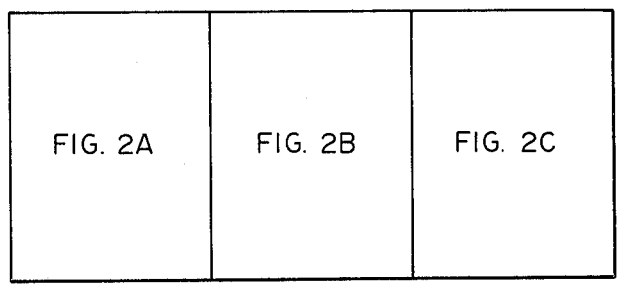
FIGS. 2A, 2B and 2C, when combined as shown in FIG. 2, form a detailed schematic block diagram showing a specific embodiment of the apparatus shown in FIG. 1.
Figure 2A:
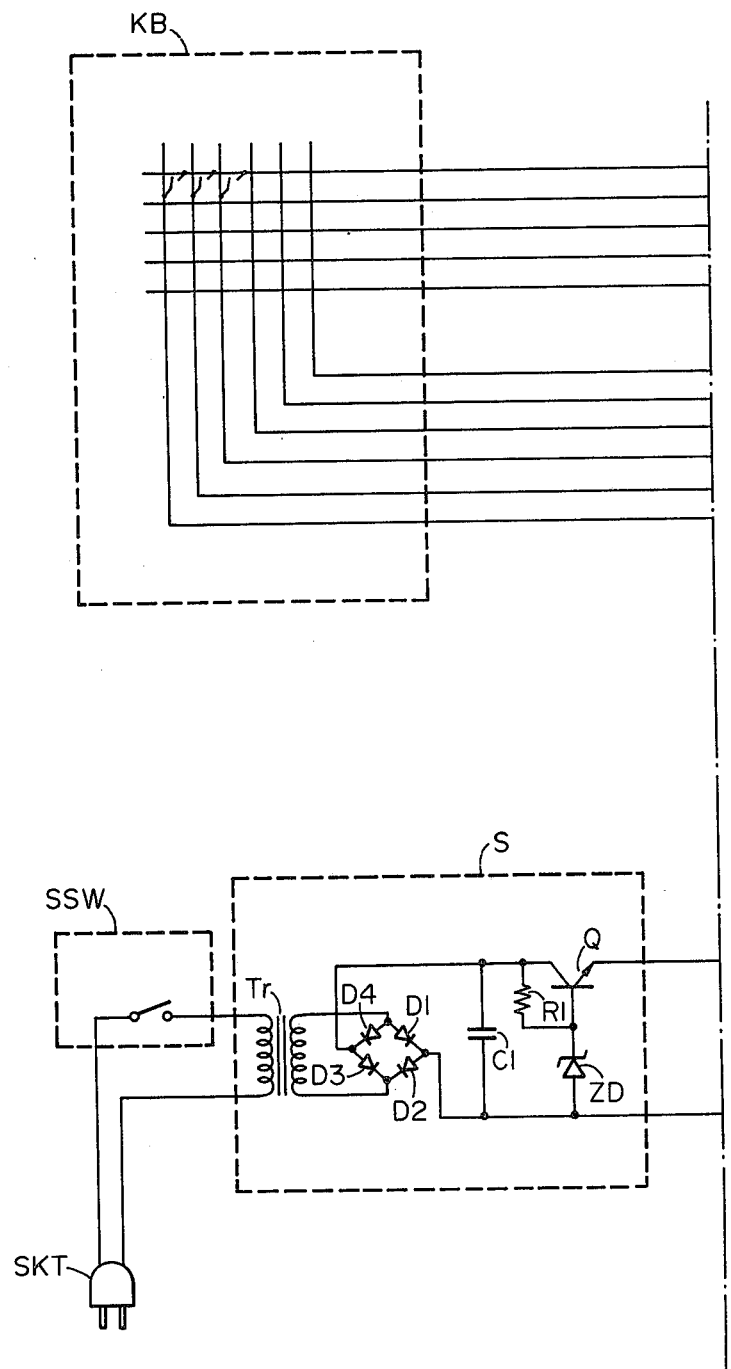
Figure 2B:
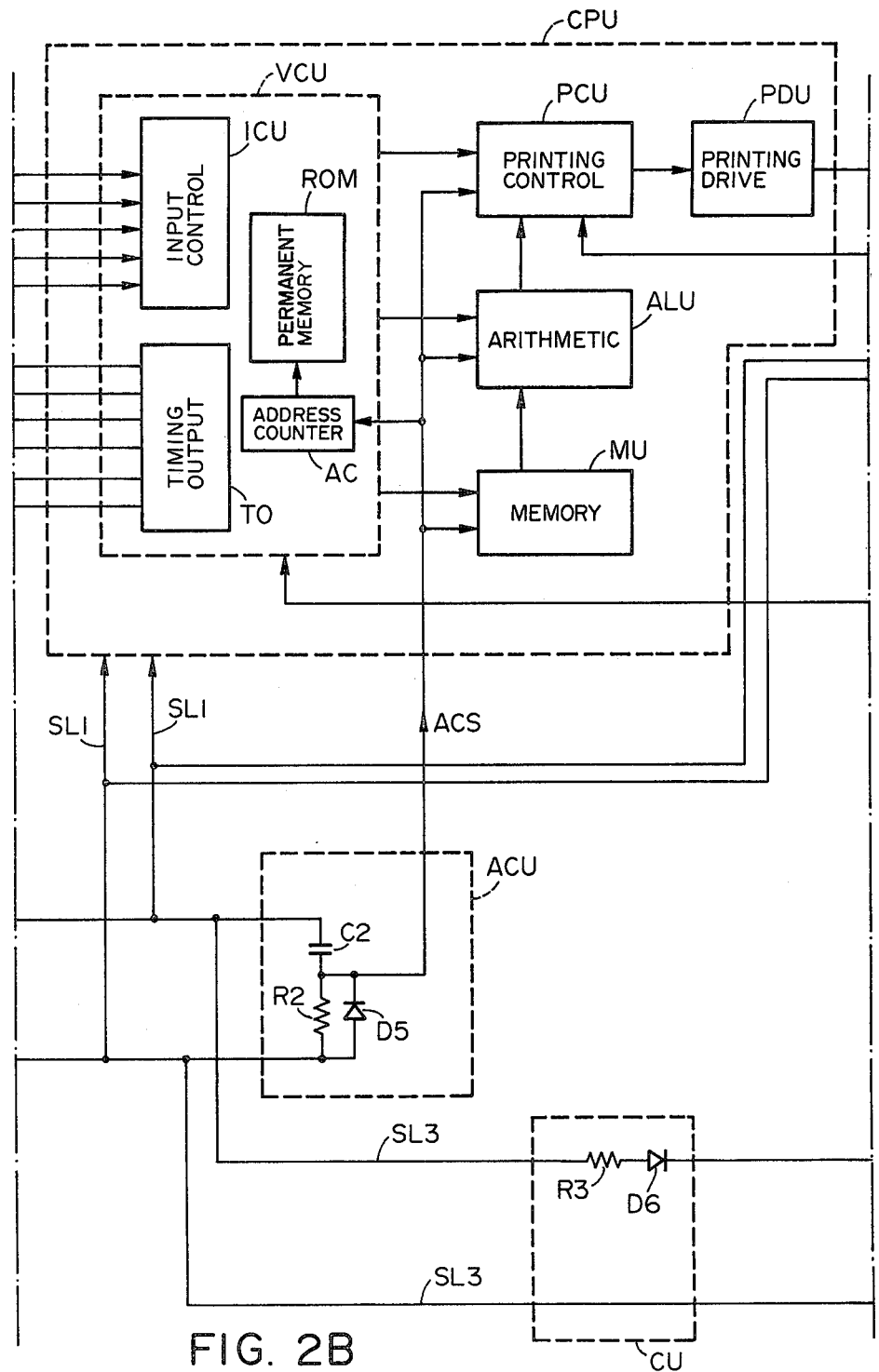
Figure 2C:
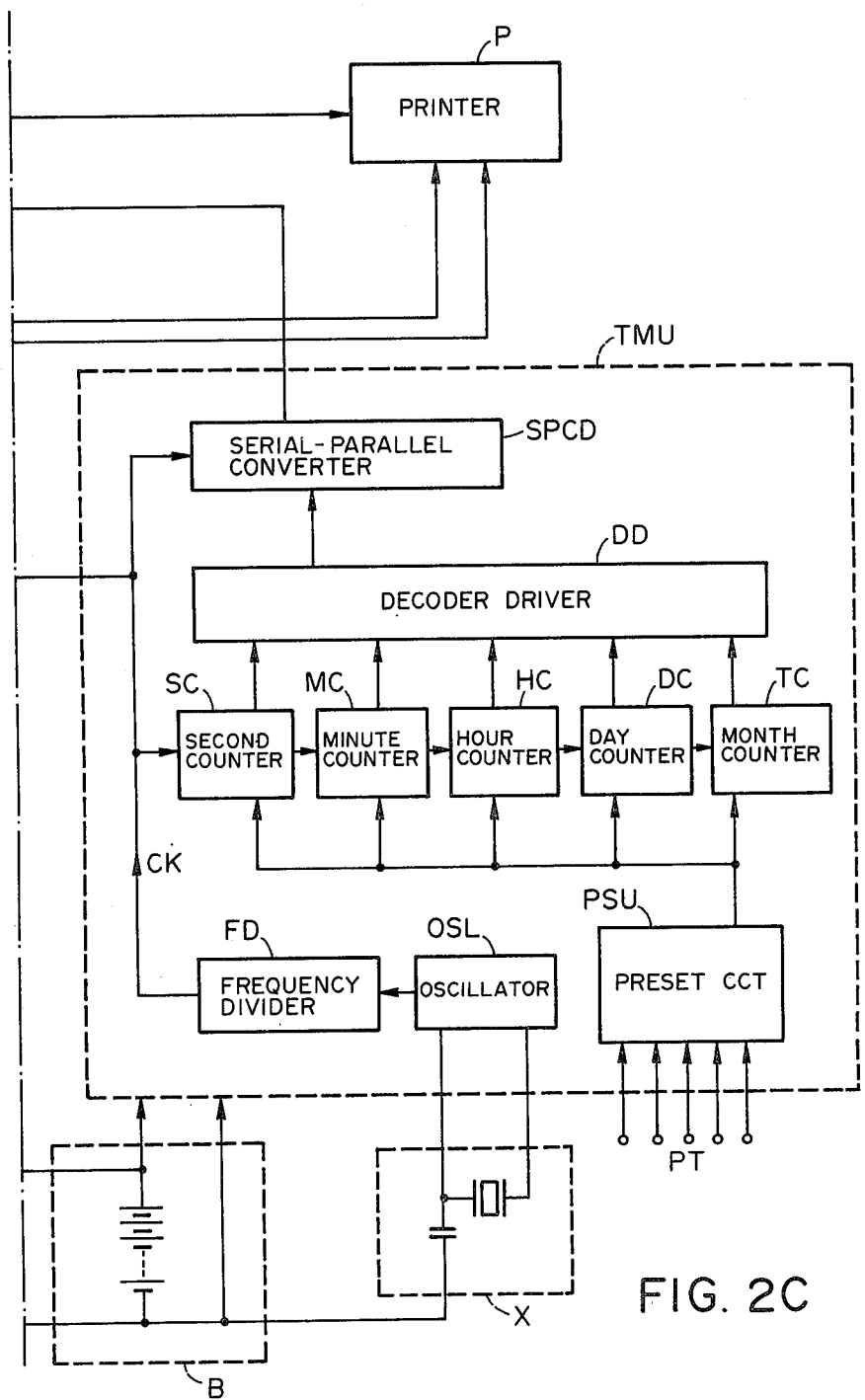

FIGS. 2A, 2B and 2C show a specific configuration of the circuits accomplishing the function of the blocks shown in FIG. 1. In FIG. 2, the DC power source S is a DC regulated power source which is fed from the commercial AC power supply and provides regulated output from, for example, the power transformer Tr used to obtain desired voltage, rectifier diodes $D_1-D_4$ and smoothing capacitor $C_1$ for rectification, and the transistor Q connected to Zener diode ZD and resistor $R_1$.

The DC output from the power source S is made and broken by the power switch SSW placed between the socket SKT and the power source S. The output of the power source S is also supplied to the charging circuit CU and the rectified output thereof is applied to both electrodes of battery B as charging voltage.

The automatic clear circuit ACU is composed of the resistor $R_2$ and capacitor $C_2$ in series and a diode D5 connected in parallel to the resistor $R_2$. The DC output from the power source S is applied across both ends of the serial circuit, and the automatic clear signal ACS is picked up from the connecting point of the capacitor $C_2$ and resistor $R_2$. After turning on the power switch SSW, the automatic clear signal ACS is generated for a period equivalent to a time constant determined by the resistor $R_2$ and capacitor $C_2$, and then the circuit enters its stationary state.

Now, the internal structures of the main control CPU and clock circuit TMU shown in FIG. 2 will be explained.

The main control CPU shown by broken lines in FIGS. 2B and 2C has, as in the usual practice, various control circuits VCU, memory MU, arithmetic circuit ALU, printing control PCU, and printing drive PDU, and receives the supply of DC output from the power source S. The main component circuits of the various control circuits VCU include the read-only momory ROM, the address counter AC for addressing the ROM, the input control ICU receiving key inputs from the keyboard KB, and the timing output circuit generating timing outputs for various keys on the keyboard KB.

The clock circuit TMU has the oscillator OSL, the frequency divider FD for frequency dividing the OSL output, the preset circuit PSU which presets year, month, day, and time of day externally through the preset terminal PT, the second counter which is supplied with clock pulse CK from the frequency divider FD, the minute counter MC which is supplied with SC output, the hour counter HC which is supplied with MC output, the day counter which is supplied with HC output, the month counter TC which is supplied with DC output, the decoder driver DD which is supplied with the outputs of counters SC, MC, HC, DC, and TC, and the serial-parallel conversion circuit SPCD which converts the output of the decoder driver DD into print control parallel outputs in synchronism with the clock pulse CK. This clock circuit TMU is supplied with power from the battery B.

As was described before, in response to the power switch SSW being turned on, the automatic clear signal ACS which is generated by the automatic clear circuit ACU is applied to the memory MU, arithmetic ALU, and printing control PCU of the main control CPU to clear these circuits. In the case where the control is provided by the program sequences stored in the read-only memory ROM, the initialization of the control is designated by setting the address counter AC, to designate a predetermined ROM address. In other words, after designating an address of the read-only memory ROM to a special location by using automatic clear signal ACS, and after the automatic clear signal ACS has ended, the program automatically advances from a specific address to a predetermined address and, in accordance with the instruction code stored in advance in the predetermined address, controls such as for arithmetic operation, memorization, and printing are executed in sequence.

In accordance with the invention, control is performed in such a way that the clock data print instructions are stored at the predetermined addresses which follow the above-mentioned specific address for the ROM and the clock signals from the clock circuit TMU are input to the printing control PCU, the clock signals are compiled into print data and supplied to the print drive circut PDU. In this way the clock data are printed out on the printer P automatically in response to the power switch SSW being turned on.

The main control CPU which receives such clock data and controls printing can be realized by the devices available on the market as standard LSIs for electronic desk calculators, as well as by a combination of commercially available semiconductor devices for use in microcomputers with ROM in which the programs as mentioned above have been stored. On the other hand, as for the clock circuit TMU, the parts available on the market in the form of a CMOS-LSI for clock use and as the parts to be assembled in various devices, for example Model HD44010 of Hitachi Limited, may be used. However, since this LSI does not contain the serial-parallel conversion circuit SPCD contained in the clock circuit TMU, it is necessary to add a well-known serial-parallel conversion circuit.

In the case where HD44010 is used as an example of clock circuit TMU, the crystal resonator X is oscillated at the inherent nominal frequency 4,194,304 Hz, a clock pulse of 1024 Hz is formed by frequency dividing the frequency by $2^{12}$th in the frequency divider FD of the next stage, the 1024 Hz clock pusle is supplied to the main control CPU as the synchronizing clock CK and is further frequency divided to $2^{10}$ and applied to the second counter SC of the next stage to be frequency divided into second, minute, hour, day, and month by the counters SC, MC, HC, DC, and TC in that order. Next, these signals from the counters SC-TC are decoded in the decode driver DD to form serial output signals. Next, those serial signals are converted into parallel signals by the serial-parallel conversion circuit SPCU and supplied to the main control CPU where they are compiled as printing data, while synchronization is being established between them and the synchronizing clock pulse CK coming from the frequency divider FD.

The operations thereafter are performed similarly to the print control of ordinary recording type electronic desk calculators, and the clock data existing at the time of turning on the power switch SSW is printed out on the printer P.

Additionally, this invention is applicable also to ordinary electronic desk calculators having a liquid crystal display and printer, and enables the printer to print out the date and the time the power is turned on and at the same time display the date and the time.

Moreover, not being limited to electronic desk calculators, this invention is also very effective when applied to electronic devices such as cash registers and adders which require the recording of day and time data at the time of turning on the power supply.

According to this invention the following effects are achieved.

(1) Since the day, hour etc. are automatically printed out, the day, hour, etc. at which the computer starts in operation are made clear by checking the printed output later, which is especially effective in the management of totalizing jobs when controlling totalizing work continuously.

(2) Compared with a conventional system where the date, time, etc. are read separately from calendar and clock and are input manually from the keyboard, the method according to this invention is more error free, accurate and rapid.

(3) Compared with a system where the day, hour etc. are printed in response to key commands such as day, hour print command keys, since in the method according to this invention the day, hour, etc. are printed automatically by turning on the power switch, the possibility of forgetting the printing instruction of day, hour, etc. is eliminated.

(4) Moreover, even when the power switch is turned off at will and then immediately turned on, the corresponding time can be printed. In other words the apparatus according to this invention is excellent in operability and needs no special print command key for time, etc.

(5) When the electronic desk calculator or the like which is connected to the commercial power source is involved in an accident such as power failure or instantaneous power interruption, the automatic clear output ACS is generated at the time of recovery. In other words such recovery time is made clear.

What I claim is:

1. A recording-type electronic apparatus comprising:

key input means for entering data;

arithmetic means for processing the data entered by said key input means;

printing means for printing out the result of processing by said arithmetic means;

first electric power source means for supplying power to said arithmetic means, said power source means including voltage transformer means having a primary side connected to an alternating current source, a secondary side that produces an alternating current output having voltage lower than the voltage of alternating current input to said primary side, and means for rectifying the output voltage from said secondary side of said voltage transformer means to apply the rectified output to said arithmetic means;

switching means provided at said primary side of said voltage transformer means for controlling the power supply to said secondary side of said transformer means;

detecting means connected to an output of said rectifying means of said first electric power source means for detecting the initiation of power supply from said first electric power source means to said arithmetic means under control of said switching means;

timer means for counting time;

second electric power source means for supplying power to said timer means, having a battery which is charged by the rectified output from said rectifying means; and control means responsive to the detection by said detecting means of the supply of power from said first electric power supply means under control of said switching means for applying the time counting information from said timer means to said printing means to instruct the printing of time counting information, said control means controlling said apparatus to take a standby state for accepting data entered by said key input means after termination of the printing operation of said printing means to print the time counting information.

2. An apparatus according to claim 1, wherein said first electric power source means supplies the power to said printing means.

3. An apparatus according to claim 1, wherein said detecting means includes a resistor and a capacitor.

* * * * *